US011249265B2

(12) United States Patent
Rosenberg et al.

(10) Patent No.: US 11,249,265 B2
(45) Date of Patent: Feb. 15, 2022

(54) OPTICAL CONNECTOR ASSEMBLY CONNECTORIZED FOR NON-PERMANENT ATTACHMENT TO AN OPTOELECTRONIC SUBSTRATE ASSEMBLY

(71) Applicants: US Conec, Ltd, Hickory, NC (US); Hewlett Packard Enterprise Development LP, Houston, TX (US)

(72) Inventors: Paul Kessler Rosenberg, Sunnyvale, CA (US); George Panotopoulos, Palo Alto, CA (US); Kent Devenport, Fort Collins, CO (US); Darrell R. Childers, Hickory, NC (US); Cecil D. Hastings, Jr., Palo Alto, CA (US); Daniel D. Kurtz, Huntersville, NC (US)

(73) Assignee: US Conec, Ltd., Hickory, NC (US)

( * ) Notice: Subject to any disclaimer, the term of this patent is extended or adjusted under 35 U.S.C. 154(b) by 34 days.

(21) Appl. No.: 16/920,487

(22) Filed: Jul. 3, 2020

(65) Prior Publication Data
US 2020/0348475 A1 Nov. 5, 2020

Related U.S. Application Data

(63) Continuation of application No. 16/080,280, filed as application No. PCT/US2016/019747 on Feb. 26, 2016, now Pat. No. 10,705,303.

(51) Int. Cl.
G02B 6/42 (2006.01)
G02B 6/38 (2006.01)

(52) U.S. Cl.
CPC ......... *G02B 6/4292* (2013.01); *G02B 6/3821* (2013.01); *G02B 6/4251* (2013.01);
(Continued)

(58) Field of Classification Search
CPC .. G02B 6/3834; G02B 6/3825; G02B 6/3826; G02B 6/423; G02B 6/4214;
(Continued)

(56) References Cited

U.S. PATENT DOCUMENTS 5,671,311 A 9/1997 Stillie et al.
5,732,175 A 3/1998 Fan
(Continued)

FOREIGN PATENT DOCUMENTS

CN 100472258 C 3/2009
EP 1182478 B1 11/2006
(Continued)

OTHER PUBLICATIONS

Chuang, S. et al., "Development and Qualification of a Mechanical-optical Interface for Parallel Optics Links," (Research Paper), Feb. 11, 2015, 8 pages, available at http //www.usconec.com/LiteratureRetrieve.aspx?ID=222018.
(Continued)

*Primary Examiner* — Ryan A Lepisto
*Assistant Examiner* — Erin D Chiem

(57) ABSTRACT

An optical connector assembly (OCA) includes a connector housing to maintain alignment between optical components housed within the OCA and photoelectric converters on an optoelectronic substrate (OES) assembly. The optical components include a ferrule and an optical cable. The ferrule is optically coupled to the optical cable. The OCA includes a ferrule holder to hold the ferrule within the OCA, and a spring located between the connector housing and the ferrule holder. The spring is to apply a separating force between the ferrule holder and the connector housing. The OCA includes a gasket coupled to the connector housing. The coupling of the connector housing to a socket compresses the gasket to provide a seal between the connector housing and the socket.

20 Claims, 17 Drawing Sheets

(52) U.S. Cl.
CPC .......... *G02B 6/3825* (2013.01); *G02B 6/3826* (2013.01); *G02B 6/3834* (2013.01); *G02B 6/423* (2013.01)

(58) Field of Classification Search
CPC .. G02B 6/4292; G02B 6/4215; G02B 6/4251; G02B 6/3821
See application file for complete search history.

(56) References Cited

U.S. PATENT DOCUMENTS

| | | | |
|---|---|---|---|
| 5,781,682 A | 7/1998 | Cohen et al. | |
| 6,019,519 A | 2/2000 | Grinderslev et al. | |
| 6,198,864 B1 | 3/2001 | Lernoff et al. | |
| 6,209,928 B1 | 4/2001 | Benett | |
| 6,250,818 B1 | 6/2001 | Loughlin et al. | |
| 6,540,414 B1 | 4/2003 | Brezina et al. | |
| 6,682,230 B1 | 1/2004 | Demangone | |
| 6,815,729 B1 | 11/2004 | Brophy et al. | |
| 6,861,641 B1 | 3/2005 | Adams | |
| 6,863,450 B2 | 3/2005 | Mazotti et al. | |
| 6,890,107 B1 | 5/2005 | Brophy et al. | |
| 7,076,144 B2 | 7/2006 | Loder et al. | |
| 7,129,722 B1 | 10/2006 | Brophy et al. | |
| 7,281,856 B2 | 10/2007 | Grzegorzewska et al. | |
| 7,281,862 B2 | 10/2007 | Oen et al. | |
| 7,287,914 B2 * | 10/2007 | Fujiwara | G02B 6/4214 385/52 |
| 7,329,054 B1 | 2/2008 | Epitaux et al. | |
| 8,047,856 B2 * | 11/2011 | McColloch | G02B 6/4285 439/71 |
| 8,277,128 B2 | 10/2012 | Hackett | |
| 8,382,384 B2 * | 2/2013 | Nekado | G02B 6/4201 385/92 |
| 8,398,421 B2 | 3/2013 | Haberek et al. | |
| 8,591,244 B2 | 11/2013 | Thomas et al. | |
| 8,849,085 B2 * | 9/2014 | Meadowcroft | H01R 13/5213 385/134 |
| 8,932,084 B2 | 1/2015 | Thackston et al. | |
| 9,229,182 B2 * | 1/2016 | Ishigami | G02B 6/4292 |
| 9,235,019 B2 | 1/2016 | Shastri | |
| 9,274,295 B2 * | 3/2016 | Droesbeke | G02B 6/4246 |
| 9,325,445 B2 | 4/2016 | Khor et al. | |
| 9,470,858 B2 | 10/2016 | Houbertz-Krauss et al. | |
| 9,651,745 B2 | 5/2017 | Chou et al. | |
| 9,927,581 B1 | 3/2018 | Rosson | |
| 10,330,872 B2 | 6/2019 | Rosenberg | |
| 2002/0172469 A1 | 11/2002 | Benner | |
| 2003/0201462 A1 | 10/2003 | Pommer | |
| 2004/0109649 A1 | 6/2004 | Mazotti et al. | |
| 2006/0088248 A1 | 4/2006 | Tran | |
| 2007/0297713 A1 | 12/2007 | Lu et al. | |
| 2009/0003826 A1 | 1/2009 | Jeon et al. | |
| 2009/0208168 A1 * | 8/2009 | Ishikawa | H01R 13/639 385/14 |
| 2010/0054671 A1 | 3/2010 | Ban et al. | |
| 2011/0108716 A1 | 5/2011 | Shiraishi | |
| 2011/0111624 A1 | 5/2011 | Ball | |
| 2011/0268397 A1 * | 11/2011 | Meadowcroft | G02B 6/4261 385/94 |
| 2011/0280523 A1 | 11/2011 | Yeh et al. | |
| 2012/0014639 A1 | 1/2012 | Doany | |
| 2012/0027345 A1 | 2/2012 | Castagna et al. | |
| 2012/0027346 A1 * | 2/2012 | Castagna | G02B 6/4224 385/33 |
| 2012/0121218 A1 | 5/2012 | Kim et al. | |
| 2012/0163811 A1 | 6/2012 | Doany | |
| 2012/0213475 A1 * | 8/2012 | Selli | G02B 6/4228 385/33 |
| 2013/0209040 A1 | 8/2013 | Graham et al. | |
| 2013/0216190 A1 * | 8/2013 | Haley | G02B 6/423 385/79 |
| 2013/0266255 A1 | 10/2013 | Tan et al. | |
| 2013/0272649 A1 | 10/2013 | Braunisch et al. | |
| 2014/0049292 A1 | 2/2014 | Popescu et al. | |
| 2014/0061452 A1 | 3/2014 | Schade | |
| 2014/0105549 A1 * | 4/2014 | Kohnishi | G02B 6/4292 385/78 |
| 2014/0154914 A1 | 6/2014 | Schneider | |
| 2014/0179129 A1 * | 6/2014 | Chan | H01R 12/7029 439/78 |
| 2014/0334778 A1 | 11/2014 | Walker et al. | |
| 2015/0063760 A1 | 3/2015 | Pommer et al. | |
| 2015/0079815 A1 | 3/2015 | Leigh et al. | |
| 2015/0131940 A1 | 5/2015 | Rosenberg et al. | |
| 2015/0277067 A1 | 10/2015 | Droesbeke | |
| 2015/0301293 A1 | 10/2015 | Seetharam et al. | |
| 2015/0325527 A1 | 11/2015 | Rosenberg et al. | |
| 2016/0116695 A1 | 4/2016 | Nekado et al. | |
| 2016/0195677 A1 | 7/2016 | Panotopoulos et al. | |
| 2016/0209610 A1 | 7/2016 | Kurtz et al. | |
| 2017/0131492 A1 | 5/2017 | Vallance et al. | |
| 2017/0341972 A1 | 11/2017 | Bookbinder | |
| 2018/0217335 A1 | 8/2018 | Leeson | |
| 2019/0018203 A1 | 1/2019 | Rosenberg et al. | |
| 2019/0074617 A1 | 3/2019 | Rosenberg et al. | |
| 2019/0146167 A1 | 5/2019 | Leigh et al. | |
| 2019/0157783 A1 | 5/2019 | Leigh et al. | |

FOREIGN PATENT DOCUMENTS

| | | |
|---|---|---|
| EP | 1315991 B1 | 8/2007 |
| WO | 1994000785 A3 | 3/1994 |
| WO | 2011008041 A3 | 4/2011 |
| WO | 2014021231 A1 | 2/2014 |
| WO | 2014068357 A1 | 5/2014 |

OTHER PUBLICATIONS

Delta Eleclionics, Inc., "Small Form Factor Bi-directional Transceiver Module for Gigabit Ethernet," SFBD-1250A4K1RS, Sep. 1, 2009, pp. 1-9, Revision: S3.
European Search Report and Search Opinion for EP Application No. 16891836.5, dated Oct. 22, 2018, 8 pages.
European Search Report and Search Opinion Received for EP Application No. 15909401.0, dated Oct. 25, 2018, 7 pages.
European Search Report and Search Opinion Received for EP Application No. 16891836.5, dated Oct. 22, 2018, 8 pages.
Europeann Search Report and Search Option Receive for EP Application No. 15909401.0, dated Oct. 25, 2018, 7 pages.
International Search Report and Written opinion received for PCT Application No. PCT/US2015/062334, dated Aug. 22, 2016, 10 pages.
Neutrik; "opticalCON" (Web Page), Feb. 18, 2014, 40 pages, available at https://www.fclane.com/sites/default/files/Product%20Folder%20opticalCON.- pdf.
PCT; "International Search Report" cited in Appl. No. PCT/US2016/019747; dated Oct. 27, 2016, 3 pages.
Rosenberg, P. K., et al.; "Non-Final Office Action cited in U.S. Appl. No. 15/650,197"; dated Aug. 9, 2018; 13 pages.
Rosenberg, P. K.; "Office Action 3mo." dated Nov. 2, 2018; 15 pages.
Rosenberg, P.K., et al.: "US Non-Final Office cited in U.S. Appl. No. 15/283,131" dated Dec. 21, 2018; 13 pages.
"D-Light DLT-xx-251-lw-Pyz-Lvv 2 to 12 channels 4.25 Gbps optoelectronic transmitter," Radiall Company, Datasheet, Sep. 25, 2013.
"Four Channel Hermetically Sealed Fiber Optic Transceiver", CMC Electronics, Opto766-VAR Rev 0.2 Sep. 2011.
"Optical Transceivers", Radiall, D6F005TE—2015 Edition.

* cited by examiner

OPTICAL CONNECTOR ASSEMBLY CONNECTORIZED FOR NON-PERMANENT ATTACHMENT TO AN OPTOELECTRONIC SUBSTRATE ASSEMBLY

This application claims priority to U.S. patent application Ser. No. 16/080,280, filed on Aug. 27, 2018, and to PCT/US2016/019747 filed on Feb. 26, 2016, the contents of which are incorporated by reference in their entirety.

BACKGROUND

An optical interconnect is used for high speed data communication. The optical interconnect may use an optical cable to exchange data between devices, and communicatively link a device to another device such that the data may be exchanged between the devices. The optical cable may link a component within a device to another component within the same or another device such that the data may be exchanged between the components.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
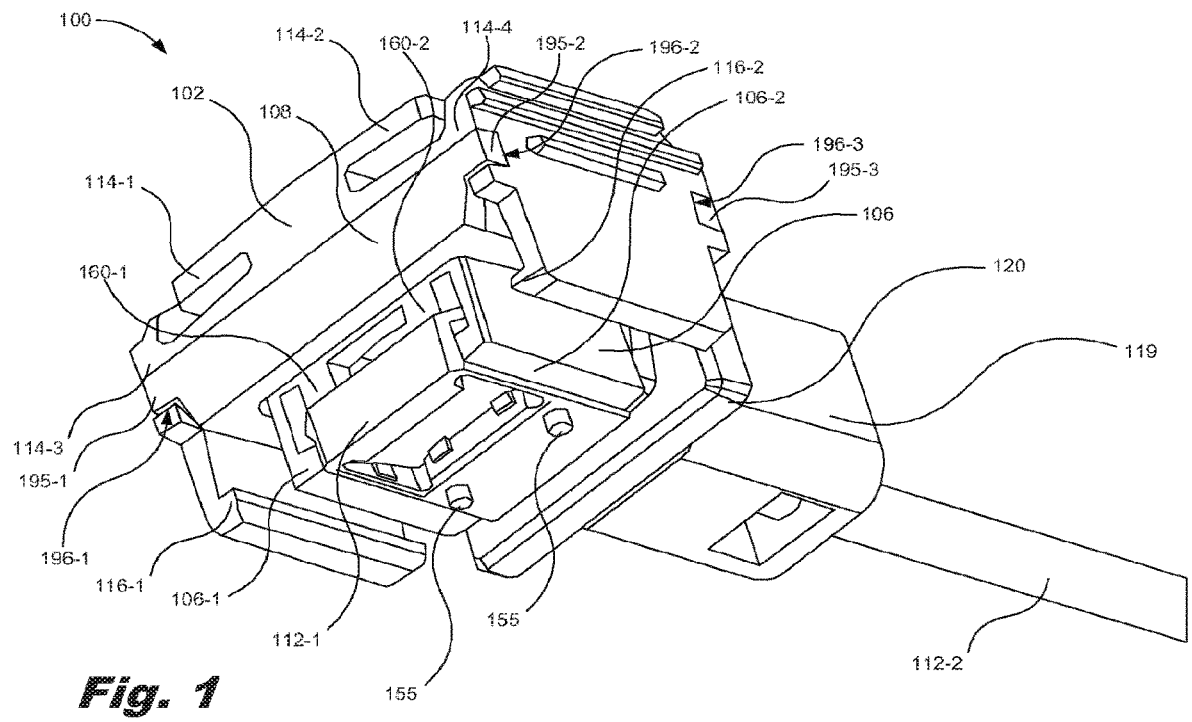
FIG. 1 is an isometric view of components of an optical connector assembly (OCA) in an assembled state, according to another example of principles described herein.

As noted above, an optical interconnect is used for high speed data communication. The optical interconnect may include two subassemblies or components. The first component is an optoelectronic substrate (OES) assembly. At least one OES assembly is located on each of the devices or each of the components of the devices that are to exchange the data. The substrate assemblies may include a number of photoelectric converters. The photoelectric converters may be any device for outputting an electrical signal based on a received optical signal from an optical cable, or a device for outputting an optical signal based on a received electrical signal.

The second component is an optical connector assembly (OCA). The OCA includes one or more optical waveguides and may also include discrete or integrated components such as lenses, mirrors, reflectors, and optical coatings to direct the optical signals between the devices or the components of the devices. The OCA may include other features or components used to align and connect the OCA to the OES assembly such that optical signals may be exchanged between the devices or the components of the devices via the optical waveguides.

In some examples, an OCA may be permanently attached to the OES assembly, using adhesive, solder, welding, or a similar method. However, if a photoelectric converter of the OES assembly fails, or if the OCA fails, both the OES assembly and the OCA are replaced since the OCA is permanently attached to the OES assembly. This may create-a large amount of waste and additional cost. It is also the case that an error may be detected in transmission between two or more OES. An optical connector assembly (OCA) that is 'connectorized' facilitates the process of identifying the source of the transmission error. In the present specification and in the appended claims, the term "connectorized" is meant to be broadly understood as a design of a device that allows the device to be attached and detached as needed.

In another example, the OCA may be secured to the OES assembly via a number of mechanical components. The mechanical components may include a number of screws or clips for attaching the OCA to the OES assembly. The process of attaching and detaching the OCA therefore is performed through the use of additional parts and possibly tools. The use of extra parts and tools, and the time required for their assembly and disassembly, increases the cost of the system in which they are used.

Examples described herein provide an optical connector assembly (OCA). The OCA includes a connector housing to maintain alignment between optical components housed within the OCA and photoelectric converters on an optoelectronic substrate (OES) assembly. The optical components include, for example, a ferrule and an optical cable, a ferrule holder to hold the ferrule within the OCA, and a spring located between the connector housing and the ferrule holder. The spring applies a downward force to the ferrule holder and an upward force to the connector housing. In other words, the spring provides a force to separate the connector housing from the ferrule holder. The ferrule is optically coupled to the optical cable.

A gasket may also be included in the OCA. The gasket may be located between the connector housing and a socket connected to the OES assembly. The coupling of the connector housing to the socket compresses the gasket to provide a seal between the OCA and the socket. Thus, the examples described herein prevents contaminants from entering any open volume inside the OCA-socket assembly, thereby disturbing optical transmission and degrading the performance of the optical components and the photoelectric converters. As a result, the system comprised of the OCA and OES is able to function normally in the presence of contaminants such as dust and other particulates that are likely to be present in many operating environments.

In the present specification and in the appended claims, the term "optical component" is meant to be broadly understood as any device or mechanism used for transmitting and receiving optical signals. The optical components may include, but are not limited to, a lens, a prism, a wave guide, a ferrule, optical waveguides including glass or plastic optical fiber, optical coatings, and an optical cable. The optical components may be housed within an optical connector assembly (OCA).

In the present specification and in the appended claims, the term "photoelectric converter" is meant to be broadly understood as any device for outputting an electrical signal based on a received optical signal (e.g., a receiver), a device for outputting an optical signal based on a received electrical signal (e.g., a transmitter), or combinations thereof including transceivers. A 'transceiver' is any device that transmits and receives electrical and optical signals. The photoelectric converters may include a number of photodiodes for converting an optical signal into an electrical signal, and a number of lasers or LEDs converting an electrical signal into an optical signal. The photoelectric converters may be contained on a OES assembly such as a printed circuit board (PCB).

In the present specification and in the appended claims, the term "optical connector," "optical connector assembly," "OCA" or similar language is meant to be broadly understood as any assembly that transmits electromagnetic waves. In one example, the OCA may include; one or more optical waveguides whose length may vary from a few millimeters up to hundreds of meters or more, and a number of ferrule/connector assemblies (FCA) attached at each end of the optical waveguides that connect to an optical socket and guide optical signals into or out of components within the sockets. The FCA may include a number of retention and alignment features formed on or defined in the FCA to precisely align and secure the FCA to a socket and the components contained within the socket. Additionally, the FCA contains one or more optical components that transform optical signals so that they are efficiently transferred between transmitting and receiving devices. The OCA may be removably secured to a socket via a number of securing features.

In the present specification and in the appended claims, the term "socket" means a device or assembly for interfacing two components. For example, the socket may be used to aid an optical connector assembly (OCA) in maintaining alignment between optical components housed within the OCA and photoelectric converters on a OES assembly. The socket may be secured to a OES assembly and removably secured to an OCA via a number of corresponding securing features.

In the present specification and in the appended claims, the term "securing features" means a feature that secures two components together. For example, the securing features may removably secure an OCA to a socket. The securing features may be in the form of a cantilever latch or a hook, a pair of magnets, or a wedge in a slot, among other types of fasteners.

In the present specification and in the appended claims, the term "gasket" means a mechanical device that provides a seal between two or more components. The gasket may provide a seal between an OCA and a socket. The gasket may be compressed in the process of attaching an OCA to a socket.

In the present specification and in the appended claims, the term "ferrule holder" means a component that retains another component. For example, the ferrule holder may be a component of an OCA that retains a ferrule, and is attached to the connector housing in a manner that allows the ferrule holder and ferrule to move inside the outer cover in a direction parallel to the direction of light propagation into and out of the socket. Alignment between the ferrule holder and outer cover may be provided by a number of vertical posts which may engage in slots of a connector housing. Alignment and retention between the ferrule holder and the outer cover may also be achieved using, for example, a piston on the ferrule holder running in a cylinder integrated into the outer cover. However, any other types of alignment and retention devices may be used between these elements.

In the present specification and in the appended claims, the term "connector housing" is meant to be broadly understood as a component that is used to secure ferrule holder and removably attach the FCA to the socket.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is an isometric view of components of an optical connector assembly (OCA) (100) in an assembled state, according to one example of principles described herein. In one example, the components of the OCA (100) may be made of any suitable material. Considerations such as cost, strength, corrosion resistance, electrical properties, optical properties, thermoset properties, aesthetic considerations, compatibility with coating or surface treatments, among other considerations may be relevant to material selection.

Figure 11:
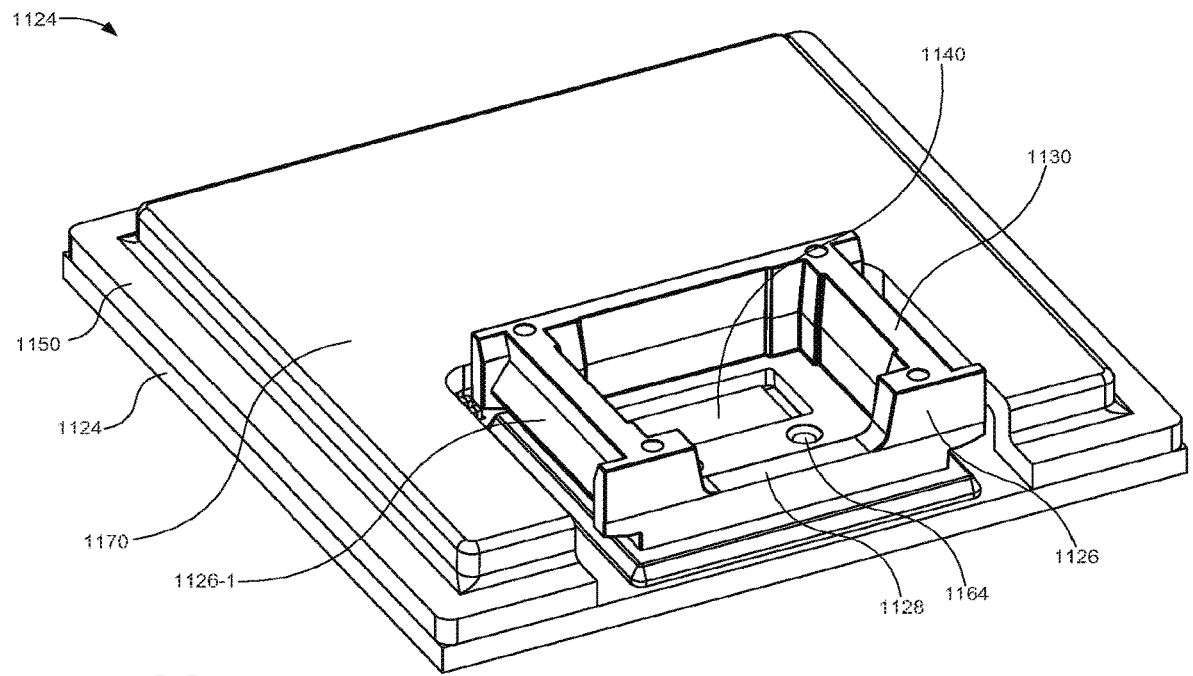
FIG. 11 is an isometric view of a socket on an OES assembly, according to another example of principles described herein.

As illustrated, the OCA (100) includes a connector housing (102). The connector housing (102) may be a component that is used to secure to another component. For example, the connector housing (102) may include a first securing feature (116-1) and a second securing feature (116-2). The securing features (116) may removably secure the OCA (100) to a socket (FIG. 11, 1126). As illustrated, the securing features (116) may be in the form of a latch or a hook.

Figure 3:
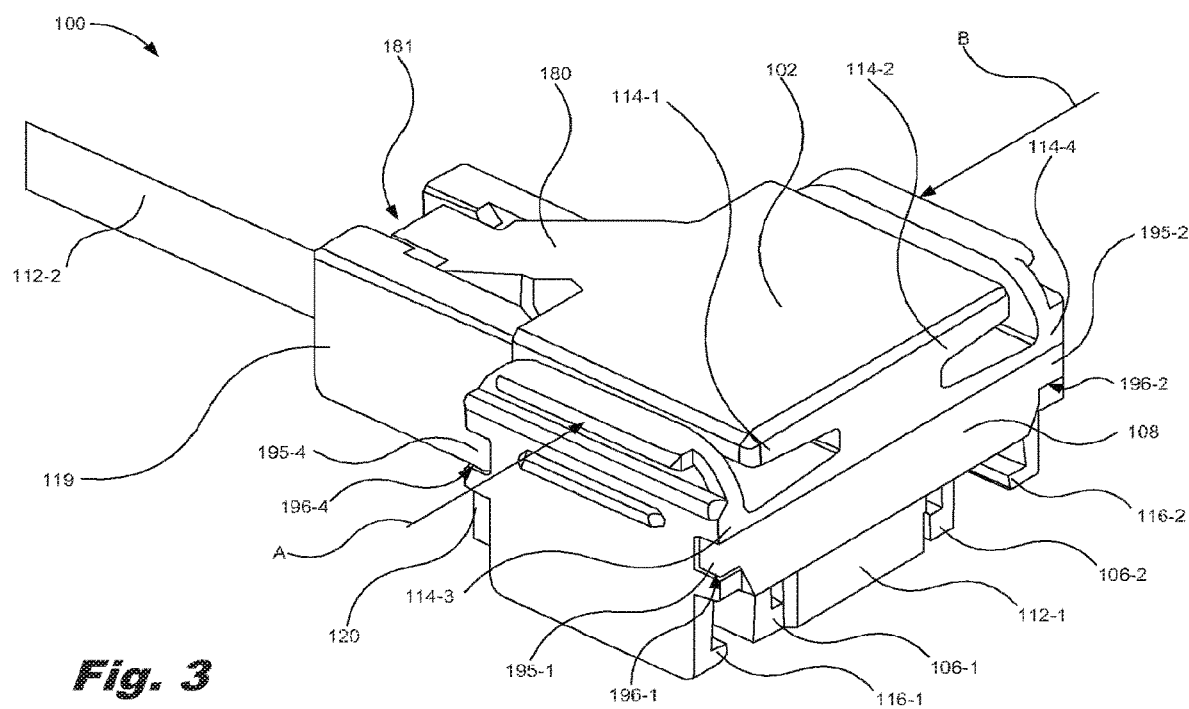
FIG. 3 is a top isometric view of components of the OCA of FIG. 1 in an assembled state, according to another example of principles described herein.
Figure 4:
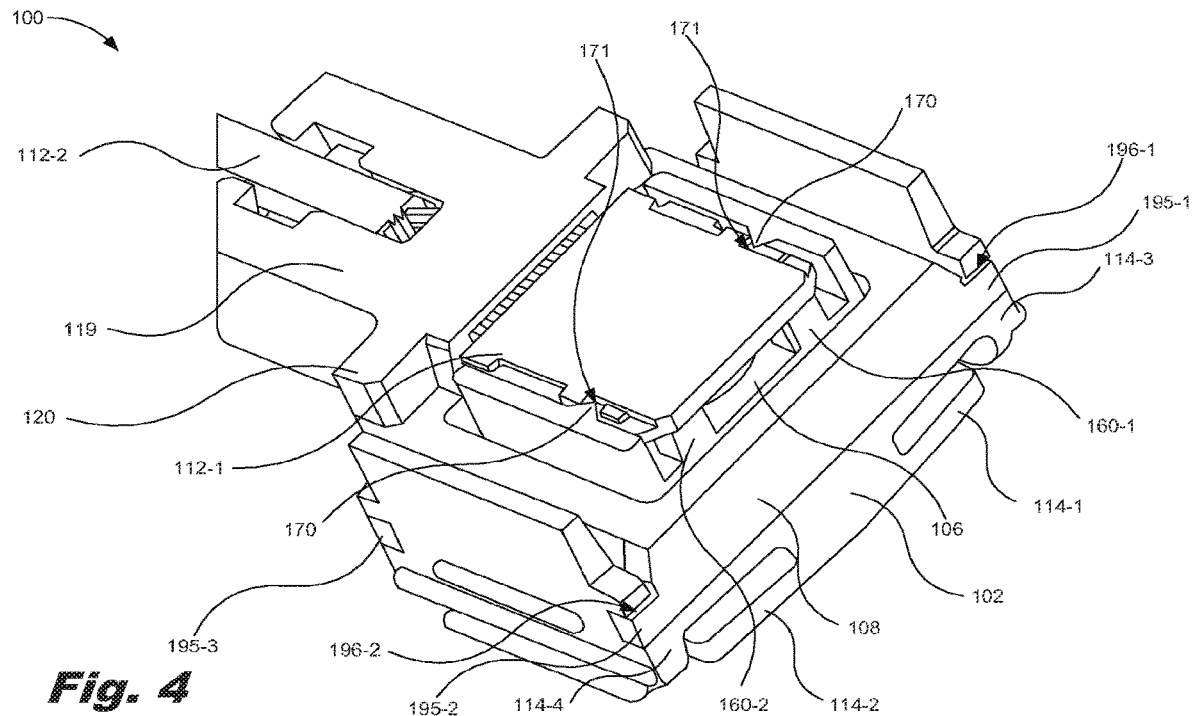
FIG. 4 is a bottom isometric view of components of the OCA of FIG. 1 in an assembled state, according to another example of principles described herein.
Figure 5:
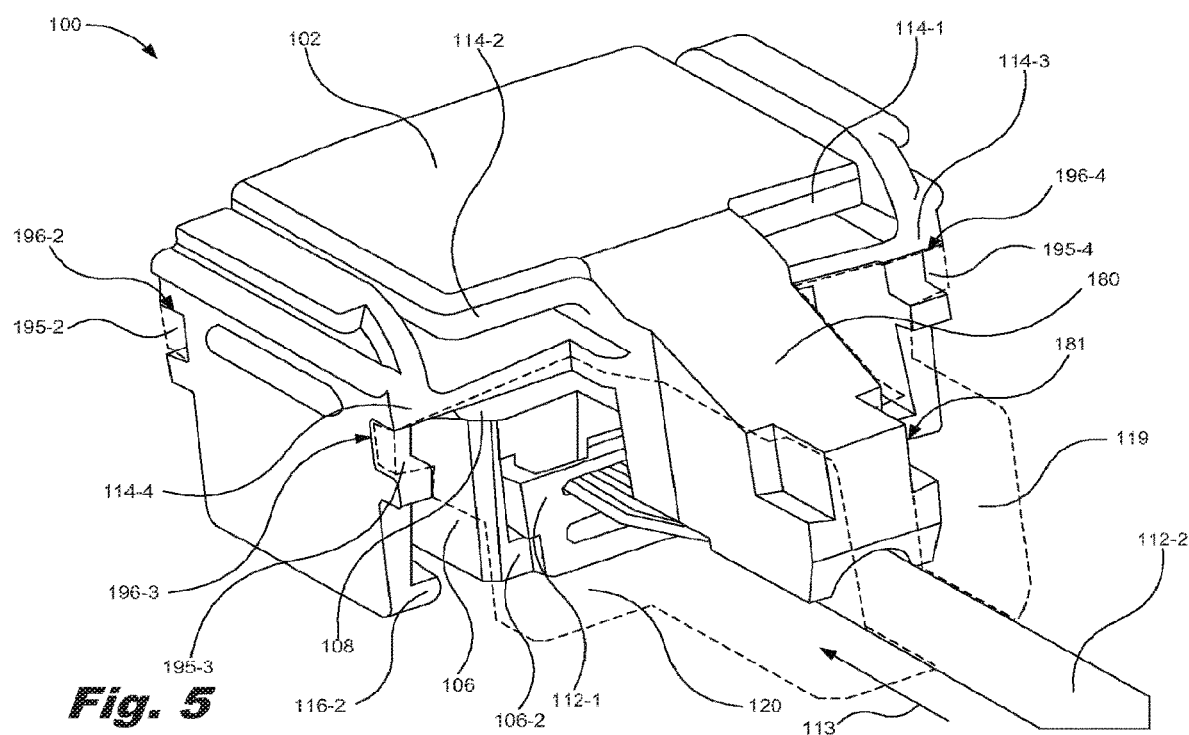
FIG. 5 is a top isometric view of components of the OCA of FIG. 1 in an assembled state, according to another example of principles described herein.
Figure 6:
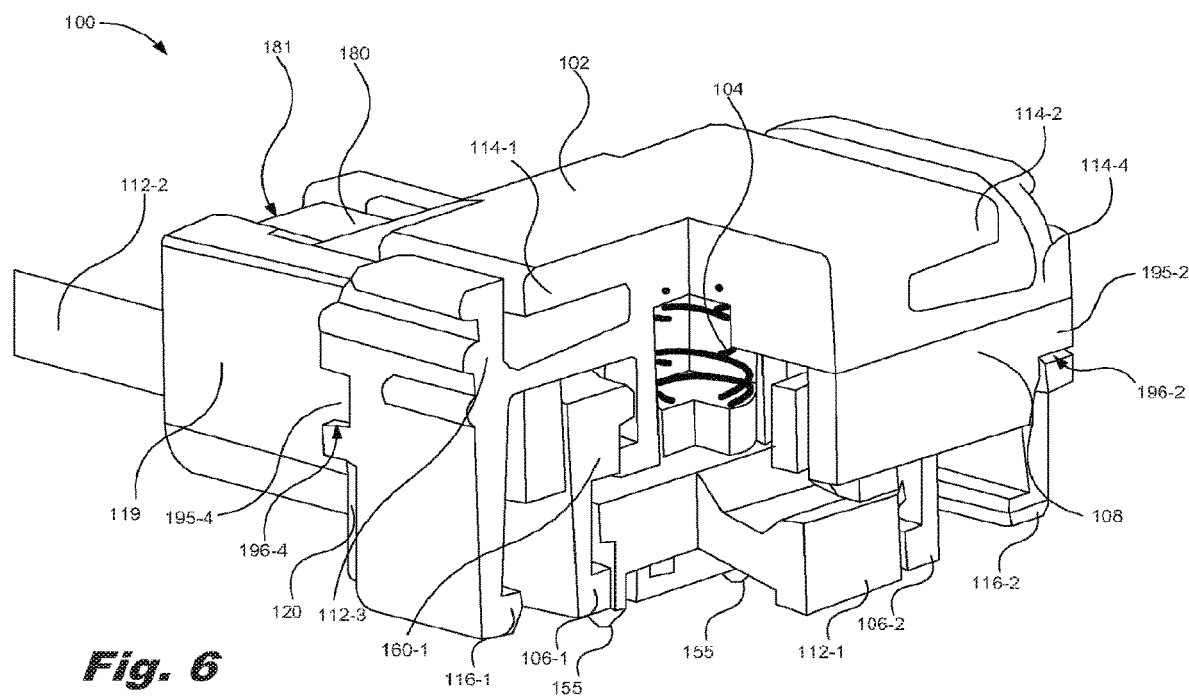
FIG. 6 is a top cut-away, isometric view of components of the OCA of FIG. 1 in an assembled state, according to another example of principles described herein.

FIGS. 3 through 6 will be used to describe the elements of the OCA (100) along with FIG. 1. FIG. 3 is a top isometric view of components of the OCA of FIG. 1 in an assembled state, according to another example of principles described herein. FIG. 4 is a bottom isometric view of components of the OCA of FIG. 1 in an assembled state, according to another example of principles described herein. FIG. 5 is a top isometric view of components of the OCA of FIG. 1 in an assembled state, according to another example of principles described herein. FIG. 6 is a top cut-away, isometric view of components of the OCA of FIG. 13 in an assembled state, according to another example of principles described herein. The connector housing (102) may include a number of stops (114-1, 114-2). For example, the connector housing (102) may include a first stop (114-1) and a second stop (114-2). The stops (114-1, 114-2) prevent the securing features (116) of the connector housing (102) from over rotating about a pivot (114-3, 114-4) of the securing features (116). For example, as the securing features (116) rotate about their respective pivots (114-3, 114-4) to engage or disengage from corresponding securing features (FIG. 11, 1126) on the socket (FIG. 11, 1126), a distance between upper portions of the securing features (116) and the stops (114-1, 114-2) changes. To prevent over rotation of the securing features (116), the upper portions may make contact with the stops (114-1, 114-2). In this manner, the stops (114-1, 114-2) prevent permanent deformation of the securing features (116) and the pivots (114-3, 114-4). The securing features (116) allows the connector housing (102) to be connectorized to the socket (FIG. 11, 1126) by allowing for the connector housing (102) to be attached and detached from the socket (FIG. 11, 1126) any number of times.

The connector housing (102) of the OCA (100) may maintain alignment between optical components (112) housed within the OCA (100) and photoelectric converters (FIG. 11, 1140) on a OES assembly (FIG. 11, 1124). In one example, the optical components (112) may include a ferrule (112-1) and an optical cable (112-2) optically and mechanically coupled to the ferrule (112-1).

Figure 7:
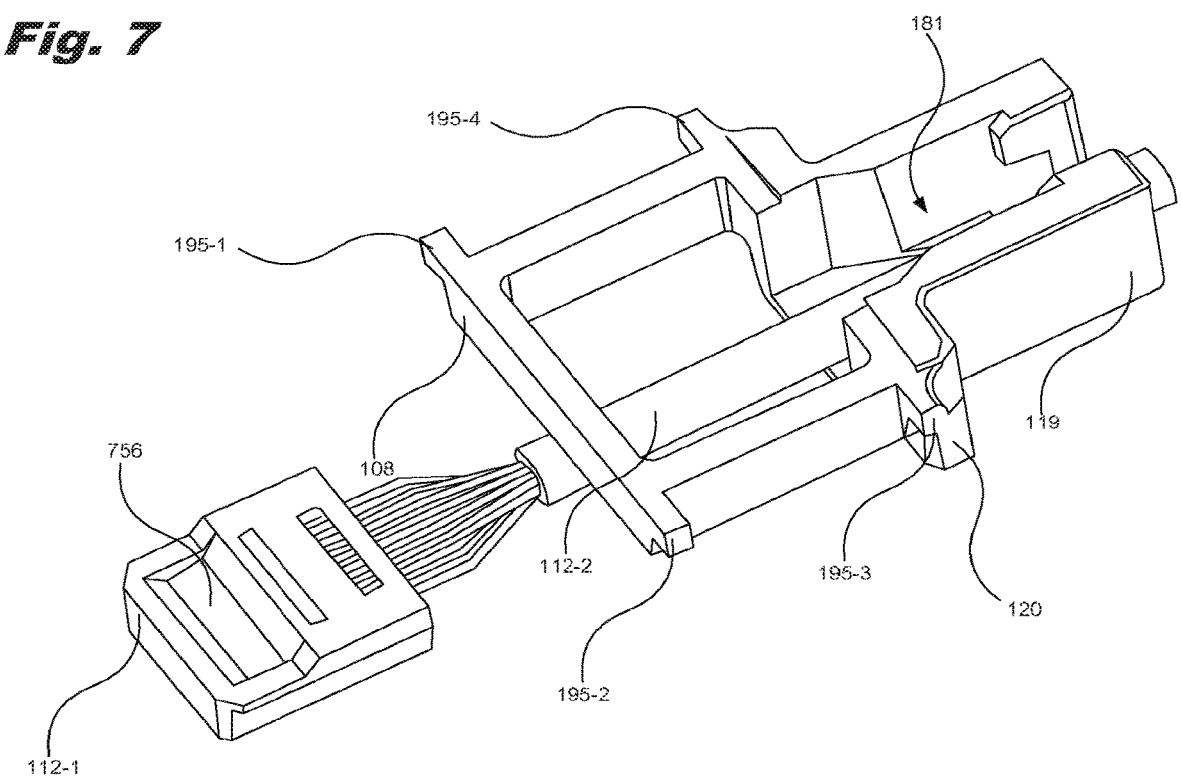
FIG. 7 is a top isometric view of a ferrule, fiber optic cable and gasket of the OCA of FIG. 1 in a partially assembled state, according to another example of principles described herein.

The ferrules (106) described throughout the examples herein include a lens array (756) as depicted in, for example, FIG. 7. When the OES is operating in receive mode, the lens array (756) receives optical signals from the optical cable (112-2) optically coupled to the ferrule (112-1). When the ferrule (112-1) is optically coupled to the socket (FIG. 11, 1126), the ferrule (112-1) further relays those optical signals to ferrule optics and on to the photoelectric converters (FIG. 11, 1140) located within the socket (FIG. 11, 1126) and electronically coupled to the OES assembly (FIG. 11, 1124), or directly to the photoelectric converters (FIG. 11, 1140). The ferrule (112-1) operates to couple light bi-directionally between a number of optical fibers of the optical cable (112-2) embedded in the ferrule (112-1) and receiving devices, such as photodiodes of the photoelectric converters (FIG. 11, 1140) on the OES assembly (FIG. 11, 1124). The ferrule (112-1) further operates to couple light bi-directionally between at least one light emitting device on the photoelectric converters (FIG. 11, 1140) and the optical fibers embedded in the ferrule (112-1) when the OES is operating in transmit mode. In this manner, optical signals are sent bi-directionally through the optical cable (112-2) relayed to and from the photoelectric converters (FIG. 11, 1140), and may be processed by a processing device.

As illustrated, the OCA (100) includes a ferrule holder (106). The ferrule holder (106) may be a component of the OCA (100) that holds a ferrule (112-1). In one example, the ferrule (112-1) slides into the ferrule holder (106) to hold the ferrule (112-1) as indicated by arrow 113 as depicted in, for example, FIG. 5. As a result, the ferrule holder (106) holds the ferrule (112-1) within the OCA (100). In one example, the ferrule (112-1) slides into the ferrule holder (106) via a number of rails (106-1, 106-2) formed on the ferrule holder (106) used to retain the ferrule (112-1) within the ferrule holder (106). The ferrule holder (106) also serves to contact a surface of the ferrule (112-1) when the OCA (100) is coupled to the socket (FIG. 11, 1126).

Figure 2:
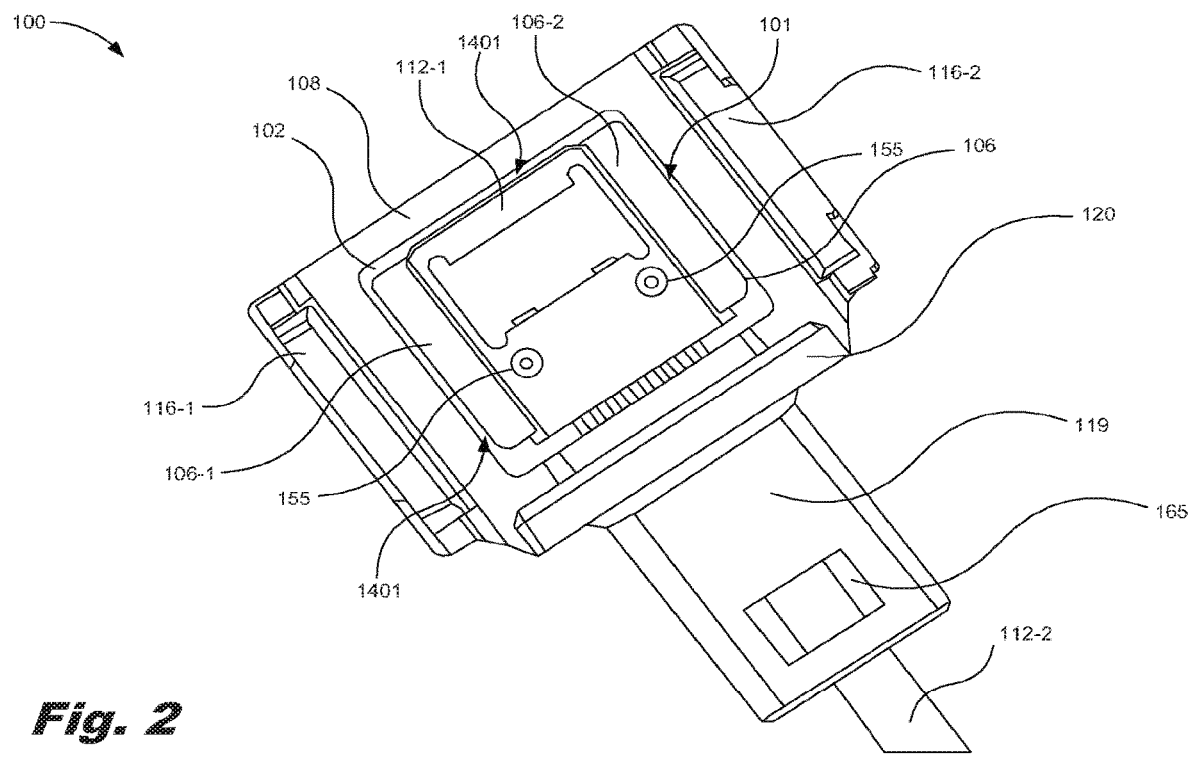
FIG. 2 is a bottom view of components of the OCA of FIG. 1 in an assembled state, according to another example of principles described herein.

Connection of the connector housing (102) to the socket (FIG. 11, 1126) will now be described in connection with FIGS. 1, 2, and 6. FIG. 2, not having been introduced above, is a bottom view of components of the OCA of FIG. 1 in an assembled state, according to another example of principles described herein. As the connector housing (102) is mated to the socket (FIG. 11, 1126), the securing features (116) are the first elements that make contact with the socket (FIG. 11, 1126). The ferrule holder (106) aligns to the inner features of the socket (FIG. 11, 1126). For final alignment, the guide pins (155) and recesses (FIG. 11, 1164) formed and defined in the ferrule (112-1) and the socket (FIG. 11, 1126) engage as will be described in more detail below. Once the guide pins (155) and the recesses (FIG. 11, 1164) engage, the mating surface of the ferrule (112-1) aligns to the socket (FIG. 11, 1126) mating surface and the ferrule (112-1), and ferrule holder (106) pushes back into the connector housing (102). More details regarding the alignment of the OCA (100) and the socket (FIG. 11, 1126) will be provided below.

A vertical distance between the ferrule (112-1) and the photoelectric converters (FIG. 11, 1140) on the OES assembly (FIG. 11, 1124) is maintained by virtue of a spring (104) forcing the ferrule holder (106) towards the ferrule (112-1), and, in turn, the ferrule (112-1) towards an interior base of the socket (FIG. 11, 1126). In one example, the vertical distance between the ferrule (112-1) and the photoelectric converters (FIG. 11, 1140) provides for optimal transmission of signals.

In one example, the spring force provided by the spring (104) assists in maintaining the proper ferrule height in the face of external forces such as, for example, vibrations or a load applied to the optical cable. In one example, the forces applied by the spring (104) are between 0.5 pounds (lbs.) and 2 lbs.

As noted above, the OCA (100) houses a number of optical components (112). The optical components (112) may be a device or mechanism used for transmitting and receiving optical signals, for example, a modulated light beam. The optical components (112) may include, but are not limited to, a lens, a prism, a wave guide, the ferrule (112-1) and the optical cable (112-2). The optical components may be housed within the OCA (100).

In one example, the ferrule (112-1) may be a mechanism that transmits and receives optical signals, for example, a modulated light beam to or from the optical cable (112-2) and to the photoelectric converters (FIG. 11, 1140) located on the OES assembly (FIG. 11, 1124).

Further, the ferrule (112-1) may be connected to an optical cable (112-2) as mentioned above. In one example, and as referenced herein, the optical cable (112-2) may be a cable containing at least one optical waveguide that is used to carry optical signals. The optical fiber may be coated with a plastic layer and contained in a protective tube suitable for the environment where the optical cable (112-2) is deployed. In one example, one end of the optical cable (112-2) is connected to a ferrule (112-1) for one device and the other end of the optical cable (112-2) is connected to another ferrule (112-1) for another device.

As illustrated, the OCA (100) includes a gasket (108). The gasket (108) may be a mechanical device that provides a seal between at least two components. When the OCA (100) is assembled, the gasket (108) may be located between the connector housing (102) and the socket (FIG. 11, 1126). The gasket (108) may provide a seal between the OCA (100), the socket (FIG. 11, 1126), and the optical components (112) including the ferrule (112-1) and the optical cable (112-2). In one example, the gasket (108) may be compressed to provide the seal when the OCA (100) is removably secured to the socket (FIG. 11, 1126).

The gasket (108) is made of a material that can withstand significant elastic deformation. In one example, the elastic material of the gasket (108) has high compression set resistance and will recover a significant amount or all of its original shape when exposed to compressive deformation. Thus, the gasket (108) is able to resist a permanent or semi-permanent deformation. Further, the gasket (108) is able to return to its original size and shape when a force applied thereto is removed. In one example, the gasket (108) may resist permanent or semi-permanent deformation even after the gasket (108) is subjected to compression for long periods of time, under elevated temperatures, or a combination thereof.

In one example, the material from which the gasket (108) is made is resistant to compression setting. Compression setting may be defined as a permanent deformation under compressive load and/or heat. In one example, the gasket (108) is made of an elastomer, a polymer, a rubber, a silicone, other elastic material, or combinations thereof. In one example, the gasket (108) may be made using any number of manufacturing processes including injection molding processes, stamping processes, cutting processes, ablation processes, etching processes, other manufacturing processes, or combinations thereof.

Further, the gasket (108) includes a material that has a predefined level of durometer or stiffness. Durometer is one of several measures of the hardness of a material and may be defined as a material's resistance to permanent indentation. By selecting the proper material durometer for the gasket (108), and optimizing the thickness of the gasket (108) and adjacent elements within the OCA (100) and OEC assembly (FIG. 11, 1124), the sealing and spring functions of the gasket (108) may be optimized. For example, a relatively low durometer (i.e., soft) material may best function as to sealing the interface between the connector housing (102) of the OCA (100) and the socket (FIG. 11, 1126). However, a relatively low durometer material may not apply a large enough force to retain engagement of the connector housing (102) to the socket (FIG. 11, 1126). The increase of decrease in spring force of the gasket (108) may be defined by the following equation:

$$F=k*x \qquad \text{Eq. 1}$$

where F is the spring force, k is the spring constant of the gasket (108) which is associated with material durometer, and x is the deformation of the material.

As mentioned above, the gasket (108) may be made of an elastomer material. In this manner, the gasket (108) is compressed between the connector housing (102) and the socket (FIG. 11, 1126) to ensure that the interior elements of the OCA (100) and OES assembly (FIG. 11, 1124) including, for example, the ferrule (112-1) and the photoelectric converters (FIG. 11, 1140) are sealed from the exterior environment. Once the gasket (108) is compressed, the gasket (108) provides a seal between the OCA (100) and the socket (FIG. 11, 1126) to prevent contaminates from degrading a performance of the optical components (112) and the photoelectric converters (FIG. 11, 1140). The gasket (108) will be described in more detail below.

Turning again to FIG. 6, the OCA (100) includes a spring (104). The spring (104) is located between the connector housing (102) and the ferrule holder (106) when the components of the OCA (100) are assembled. In an assembled configuration, the spring (104) applies a separating force between the ferrule holder (106) and the connector housing (102). As will be described in more detail below, the spring (104) forces the ferrule (112-1) downward via the ferrule holder (106), and seats the ferrule against the interior base of the socket (FIG. 11, 1126). This spring force helps maintain the proper ferrule height despite any external forces such as, for example, vibrations or a load that may be applied to the ferrule (112-1) and/or optical cable (112-2).

FIG. 7 is a top isometric view of a ferrule (112-1), fiber optic cable (112-2), and gasket (108) of the OCA (100) of FIG. 1 in a partially assembled state, according to another example of principles described herein. The gasket (108) includes a boot (119) that is coupled to or monolithically formed with the gasket (108). In an example where the gasket (108) is monolithically formed with the boot (119), the gasket (108) is made of the same material as the boot (119). In one example, the gasket (108) and the boot (119) are cut from the combined structure of the gasket (108) and the boot (119) or is molded as a feature of the combined structure of the gasket (108) and the boot (119).

A boot recess (181) is defined in the boot (119) to provide a recess in which the ferrule (112-1) and fiber optic cable (112-2) may seat. In this manner, the area at which the optical cable (112-2) exits the OCA (100) is sealed by the gasket (108) and the connector housing (102).

A protrusion (120) is also formed on the gasket (108) sized to fit in a corresponding notch (FIG. 11, 1128) of the socket (FIG. 11, 126). The protrusion (120) provides a seal between the connector housing (102) and the socket (FIG. 11, 1126) as well as seals the entire system from the external environment surrounding the system that would otherwise be able to permeate the system at, for example, the interface between the boot (119), and the socket (FIG. 11, 1126) and connector housing (102) if the protrusion (120) were not present.

The optical cable (112-2) is installed in the gasket (108) by coupling the optical cable (112-2) to the ferrule (112-1). The ferrule (112-1) is inserted through the gasket (108), and the optical cable (112-2) is inserted into the boot recess (181). The boot (119) is slid down the optical cable (112-2) until the ferrule (112-1) is centered within the gasket (108) as depicted in, for example, FIG. 2.

Figure 8:
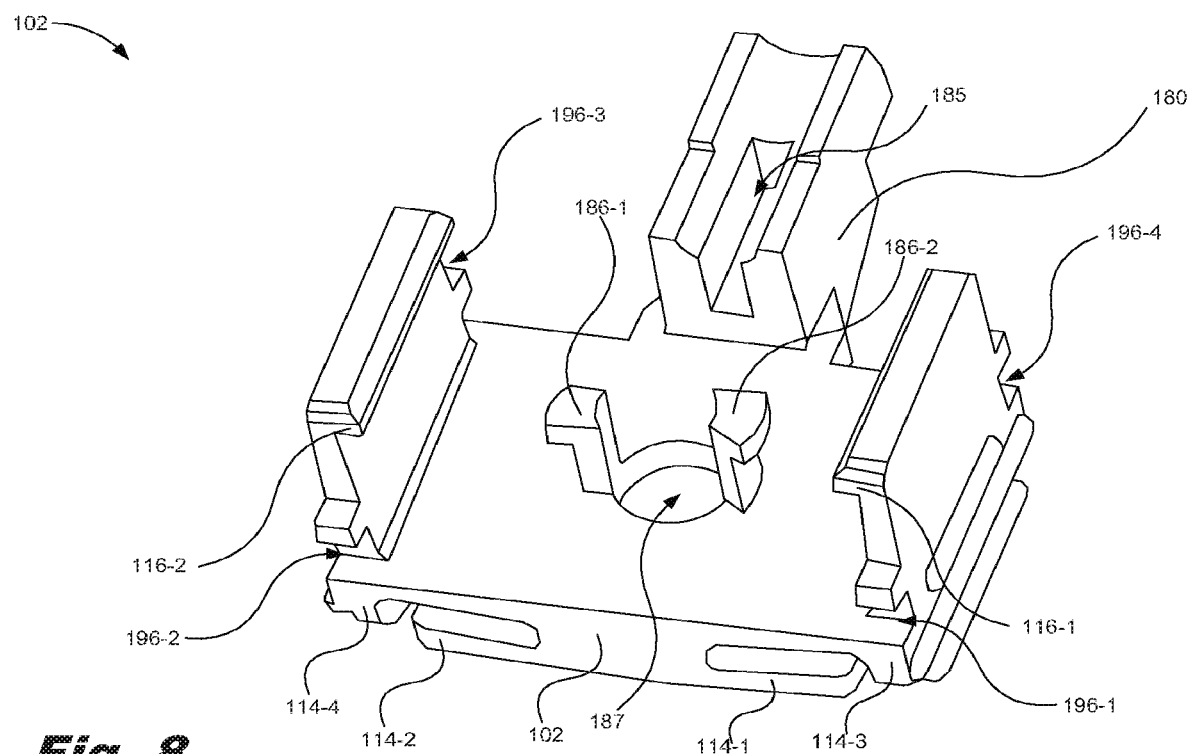
FIG. 8 is a bottom isometric view of a connector housing of the OCA of FIG. 1, according to another example of principles described herein.

FIG. 8 is a bottom isometric view of the connector housing (102) of the OCA of FIG. 1, according to another example of principles described herein. The connector housing (102) includes a number of locking arms (186-1, 186-2). Even though two locking arms (186) are depicted in FIG. 8, the connector housing (102) may include any number of locking arms (186). The locking arms (186) are used to couple the ferrule holder (106) to the connector housing (102). A spring recess (187) may be defined within the connector housing (102) between the locking arms (186) to allow a spring (104) to seat between the locking arms (186), and, when the connector housing (102) is coupled to the ferrule holder (106), to allow the spring (104) to be retained between the connector housing (102) and ferrule holder (106).

The connector housing (102) also includes an elongated portion (180) that, when the connector housing (102) is coupled to the boot (119), seats within the boot recess (181)

as depicted in, for example, FIGS. 3 through 6. The elongated portion (180) includes a recess (185) in which a portion of the optical cable (112-2) is seated when the connector housing (102) is coupled to the optical cable (112-2). The connector housing (102) does not include any vias or other through holes through which air or other contaminants may enter. In this manner, the gasket (108) is able to create a seal between the connector housing (102) and the socket (FIG. 11, 1126).

Figure 9:
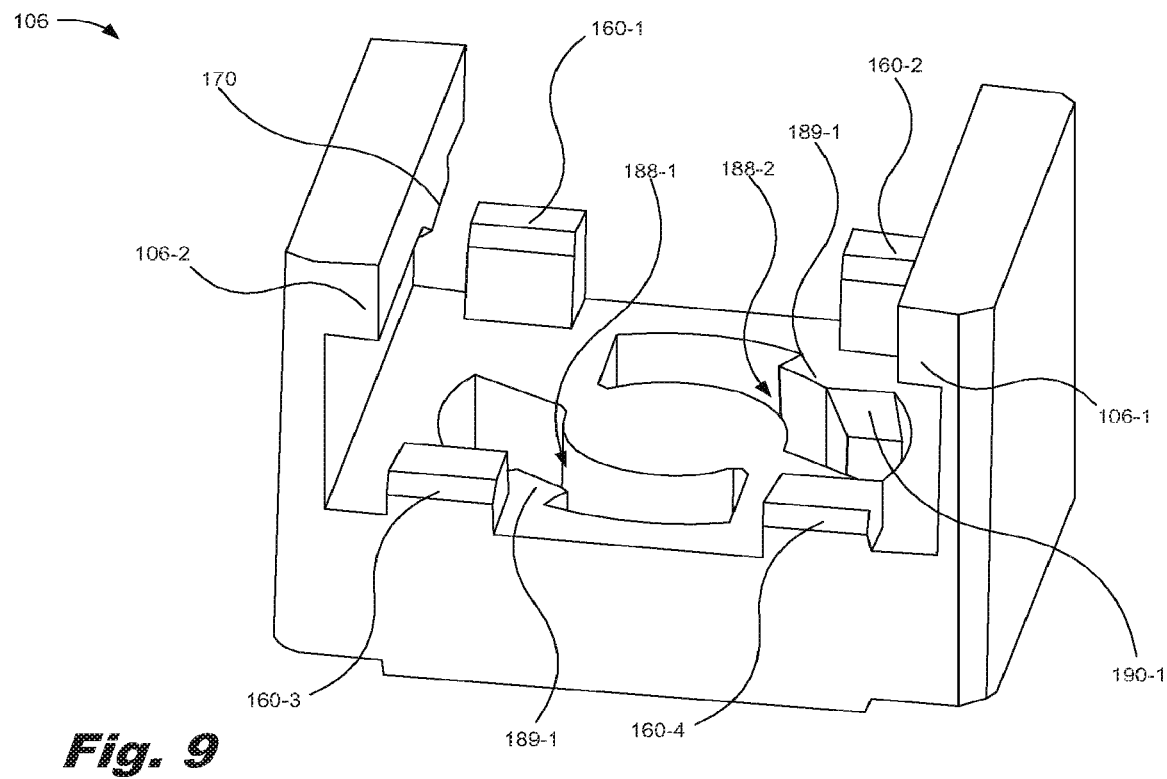
FIG. 9 is a bottom isometric view of a ferrule holder of the OCA of FIG. 1, according to another example of principles described herein.

FIG. 9 is a bottom isometric view of a ferrule holder (106) of the OCA (100) of FIG. 1, according to another example of principles described herein. The ferrule holder (106) includes a number of rails (106-1, 106-2). The rails (106-1, 106-2) retain the ferrule (112-1) within the ferrule holder (106). The ferrule holder (106) includes a number of ferrule apertures (188-1, 188-2) that receive the locking arms (186-1, 186-2), respectively. Again, although two ferrule apertures (188-1, 188-2) are depicted in FIG. 9, any number of ferrule apertures (188-1, 188-2) may be included in the ferrule holder (106). In one example, the number of ferrule apertures (188-1, 188-2) is equivalent to the number of locking arms (186-1, 186-2).

Figure 10:
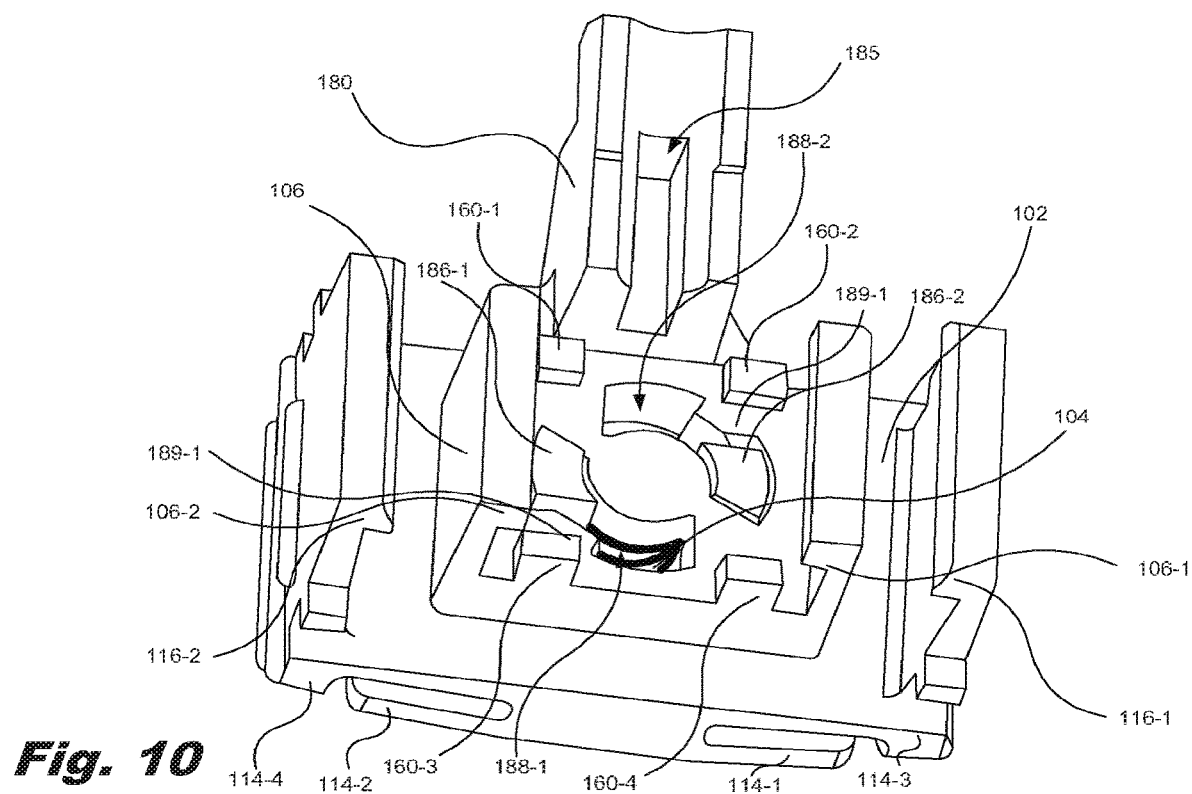
FIG. 10 is a bottom isometric view of a ferrule holder coupled to a connector housing of the OCA of FIG. 1, according to another example of principles described herein.

Each ferrule aperture (188-1, 188-2) includes an inclined plane (190) to mate the locking arms (186-1, 186-2) to the ferrule holder (106) once the locking arms (186-1, 186-2) are engaged with the ferrule holder (106). FIG. 10 is a bottom isometric view of a ferrule holder (106) coupled to a connector housing (102) of the OCA (100) of FIG. 1, according to another example of principles described herein. The assembly depicted in FIG. 10 includes the ferrule holder (106), the connector housing (102), and the spring (104) disposed between the ferrule holder (106) and the connector housing (102). In assembling these elements together, the spring (104) is placed in the spring recess (187) defined within the connector housing (102). The ferrule holder (106) is then coupled to the connector housing (102) by inserting the locking arms (186) into the ferrule apertures (188-1, 188-2). At this point, the ferrule holder (106) is positioned approximately 90 degrees in the clockwise direction from the position depicted in FIG. 10.

In order to secure the ferrule holder (106) to the connector housing (102), the ferrule holder (106) is rotated counterclockwise approximately 90 degrees. The locking arms (186-1, 186-2) engage with the inclined planes (190) formed in each ferrule aperture (188-1, 188-2). As the ferrule holder (106) is rotated in the counter-clockwise direction, the locking arms (186-1, 186-2) move up the inclined planes (190) which moves the ferrule holder (106) into abutment with the bottom of the connector housing (102). Once the ferrule holder (106) is rotated to the position depicted in FIG. 10, the locking arms (186-1, 186-2) have reached the end of the ferrule apertures (188-1, 188-2), and the locking arms (186-1, 186-2) protrude past the apertures (188-1, 188-2). In this state, the spring (104) pushes the ferrule holder (106) away from the connector housing (102), and creates a larger coefficient of friction between the locking arms (186-1, 186-2) and the bottom of the ferrule holder (106). This action locks the ferrule holder (106) to the connector housing (102).

The assembly depicted in FIG. 7 including the ferrule (112-1), the optical cable (112-2) and gasket (108) is coupled to the assembly as depicted in FIG. 10 that includes the connector housing (102), the ferrule holder (106), and the spring (104). This combined assembly is depicted in FIGS. 1 through 6. When the ferrule (112-1) is inserted into the ferrule holder (106), a number of features formed on or defined in the ferrule (112-1) and ferrule holder (106) secure these two elements to one another. For example, as depicted in the cutaway view of FIG. 4, a number of ferrule protrusions (170) are formed in the interior of the sides of the ferrule holder (106). Further, a number of ferrule channels (171) are defined in the sides of the ferrule (112-1) that contact the ferrule holder (106). When the ferrule (112-1) is inserted into the ferrule holder (106), the ferrule (112-1) runs along the rails (106-1, 106-2) and comes into contact with the ferrule protrusions (170). With an amount of force, the elastic side walls of the ferrule holder (106) spread apart, the ferrule protrusions (170) engage with the ferrule channels (171), and the side walls of the ferrule holder (106) return to their original, non-spread state. In one example, the ferrule protrusions (170) are triangular shaped such that two sides of the triangular-shaped ferrule protrusions (170) act as inclined planes to allow for the spreading of the side walls of the ferrule holder (106) from one another as the ferrule (112-1) is inserted or removed from the ferrule holder (106).

Turning again to FIGS. 1 through 10, the ferrule holder (106) may further include a number of mounting posts (160-1, 160-2, 160-3, 160-4) formed on the bottom of the ferrule holder (106). The mounting posts (160) provide an offset position between the ferrule holder (106) and the ferrule (112-1) and are used to press the ferrule (112-1) into the socket (FIG. 11, 1126) as the connector housing (102) is coupled to the socket (FIG. 11, 1126). In this manner, the spring (104) presses against the ferrule holder (106), and the mounting posts (160) press against the ferrule (112-1) with the force of the spring (104). In one example, the mounting posts (160-1, 160-2, 160-3, 160-4) are formed to have different dimensions relative to one another in order to accommodate the shape and size of the ferrule (112-1).

Further, as depicted in FIGS. 11 through 7, the gasket (108) further includes a number of gasket tabs (195-1, 195-2, 195-3, 195-4). The gasket tabs (195) are formed in the gasket (108). Further, a number of tab recesses (196-1, 196-2, 196-3, 196-4) are defined in the connector housing (102). Once coupled together, the gasket tabs (195) engage with the tab recesses (196). The gasket tabs (195) align the gasket (108) with respect to the connector housing (102) when engaged in the tab recesses (196), and assist in retaining the gasket within the OCA (100).

With reference to FIG. 2, a gap (1401) is formed between the ferrule holder (106) and the gasket (108) on at least one side of the ferrule holder (106). This allows the ferrule holder (106) to not be constrained by the gasket (108) and move or deflect from its position. As will now be described in more detail below, this will assist in the alignment of the ferrule holder (106) with respect to the socket (FIG. 11, 1126).

FIG. 11 is an isometric view of a socket (1126) on an OES assembly (1124), according to one example of principles described herein. The OES assembly (1124) mechanically supports and electrically connects electronic components and photoelectric converters. In order to interface with the OCA (100), the OES assembly (1124) may include a number of photoelectric converters (1140). The OES assembly (1124) mechanically supports and electrically connects electronic components and the photoelectric converters (1140) using conductive tracks, pads, and other electrically conductive features.

The photoelectric converters (1140) may be any device for transmitting and receiving (i.e., transceiving) electrical signals based on a received optical signal by converting the optical signal into an electrical signal. The photoelectric converters (1140) further convert electrical signals into optical signals. In one example, the photoelectric converters (1140) include a number of photodiodes. In this manner, the photoelectric converters (1140) are electrical and optical transceivers. In one example, the photoelectric converters (1140) include a number of laser devices. In another example, the photoelectric converters (1140) include a number of light-emitting diodes (LEDs).

The photoelectric converters (1140) are located on the OES assembly (1124) such as a PCB (1150). In one example, the OES assembly (1124) is a mid-board optics (MBO) circuit board. In this example, the OES assembly (1124), the socket (1126), and the OCA (100) may be located in the interior of a device or a chassis switch. In examples where the OES assembly (1124) is an MBO, the OES assembly (1124) may be located immediately adjacent to processors and application-specific integrated circuits (ASICs) in order to simplify designs, and save on resources such as power and space. Further the OES assembly (1124) being an MBO improves signal integrity, increases noise immunity, and decreases or eliminates electromagnetic interference/electromagnetic compatibility (EMI/EMC) susceptibility issues.

In one example, the OES assembly (1124) may include a heat sink (1170). The heat sink (1170) may include any architecture that spreads out and dissipates heat from, for example, the photoelectric converters (1140). In this manner, the heat sink (1170) protect any number of electrical components coupled to the OES assembly (1124) from overheating.

The socket (1126) may be any assembly providing an interface between the OCA (100) and the OES assembly (1124). For example, the socket (1126) may be used to aid the OCA (100) to maintain alignment between optical components (112) housed within the OCA (100) and the photoelectric converters (1140) on the OES assembly (1124).

In one example, the socket (1126) may be secured to the OES assembly (1124) using solder, welding, adhesives, or other types of fastening devices and processes. In one example, the socket (1126) may be secured to the OES assembly (1124) using, for example, an adhesive, such as ultraviolet (UV) adhesive and/or a thermal cure adhesive. In this example, the adhesive may be place on the OES assembly (1124) in locations where the socket (1126) makes contact on the OES assembly (1124). After the adhesive has been placed on the OES assembly (1124), the socket (1126) is then placed on the OES assembly (1124), the adhesive(s) cures, and the socket (1126) is secured to the OES assembly (1124). In this manner, the OCA (100) is removably secured to the OES assembly (1124) via the socket (1126) using a number of corresponding securing features (1126-1, 1126-2).

The socket (1126) includes a number of features (1128, 1130). The features (1128, 1130) aid the gasket (108) and the boot (119) in providing a seal between the connector housing (102) and the socket (1126). In one example, the features (1128, 1130) may include a top plane (1130). The top plane (1130) includes a level, flat surface that interfaces with the gasket (108) when the OCA (100) is coupled to the socket (1126). This allows the gasket (108) to provide a proper seal between the connector housing (102) and the socket (1126). In another example, the features (1128, 1130) include a corresponding notch (1128). The corresponding notch (1128) may accommodate the protrusion (FIG. 7, 120) of the boot (119). This further allows the boot (119) to provide a proper seal between the connector housing (102) and the socket (1126) as well as sealing the entire system from the external environment surrounding the system that would otherwise be able to permeate the system at, for example, the interfaces between the boot (119), the socket (1126), the connector housing (102), and the optical cable (112-2) if the protrusion (120) were not present.

In the examples described herein, alignment of the optical elements of the will now be described. In aligning the connector housing (102) with the socket (1126), and, in turn, the ferrule (112-1) as coupled to the connector housing (102), with the active optical elements such as the photoelectric converters (FIG. 11, 1140) located within the socket (1126), a number of alignment features (1164) may be included in the ferrule (112-1) and the socket (1126) as depicted in, for example, FIGS. 1, 2, 6, 11-13, 15, and 16. In one example, a number of guide pins (155) may be formed on the ferrule (112-1), and a number of recesses (1164) may be defined within the socket (1126). When the connector housing (102) is coupled to the socket (1126), the guide pins (155) and recesses (1164) cause the ferrule (112-1) to optically align with the active optical elements such as the optical transceiver (FIG. 11, 1140) located within the socket (1126). In FIGS. 1, 2, 6, 11-13, 15, and 16, a single post (155) and recess (1164) pair is depicted. However, a number of additional pairs may be included in the optical connector assemblies (100) described herein. The alignment features (155, 1164) are interchangeably formable wherein the guide pins (155) may be formed on the ferrule (112-1), the recesses (1164) may be defined within the socket (1126), visa versa, or combinations thereof. In examples where more than one post (155) and recess (1164) pair are included in the present systems, a number of guide pins (155) may be formed in both the ferrule (112-1) and the socket (1126) with corresponding recesses (164) defined in the opposite element relative to the guide pins (155).

Figure 12:
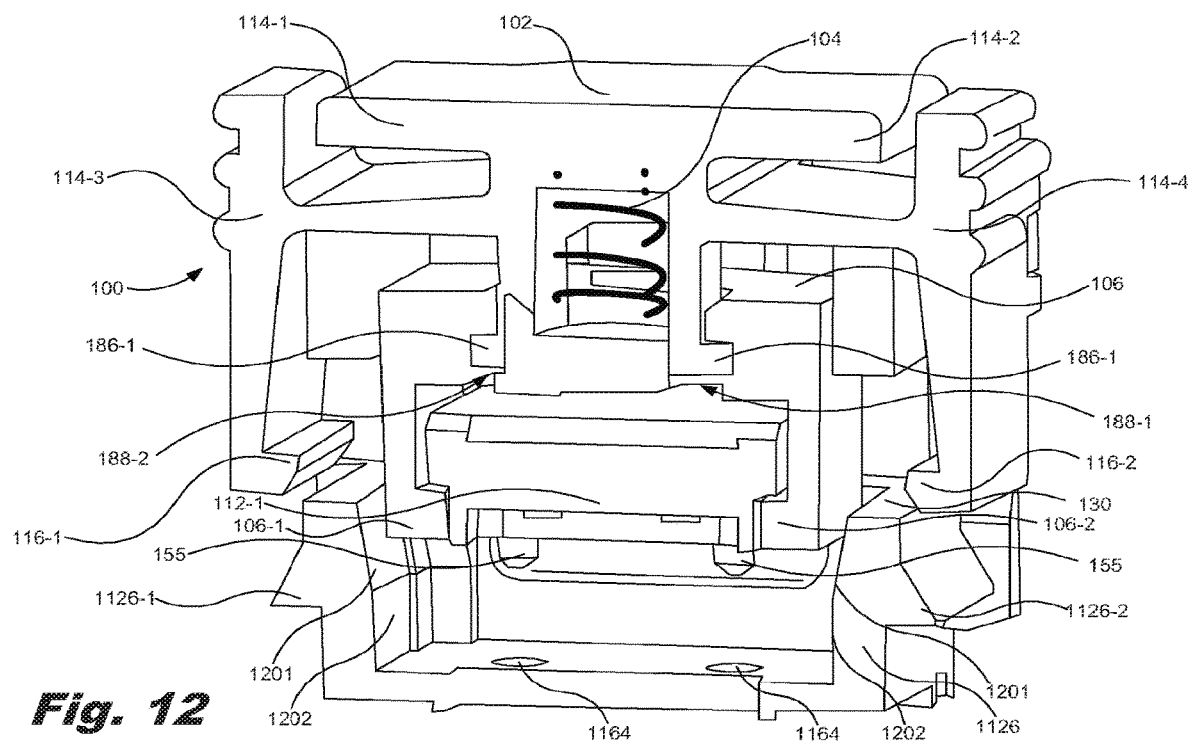
FIGS. 12 through 14 are cutaway, isometric views of the OCA of FIG. 1 being coupled to a socket, according to another example of principles described herein.
Figure 13:
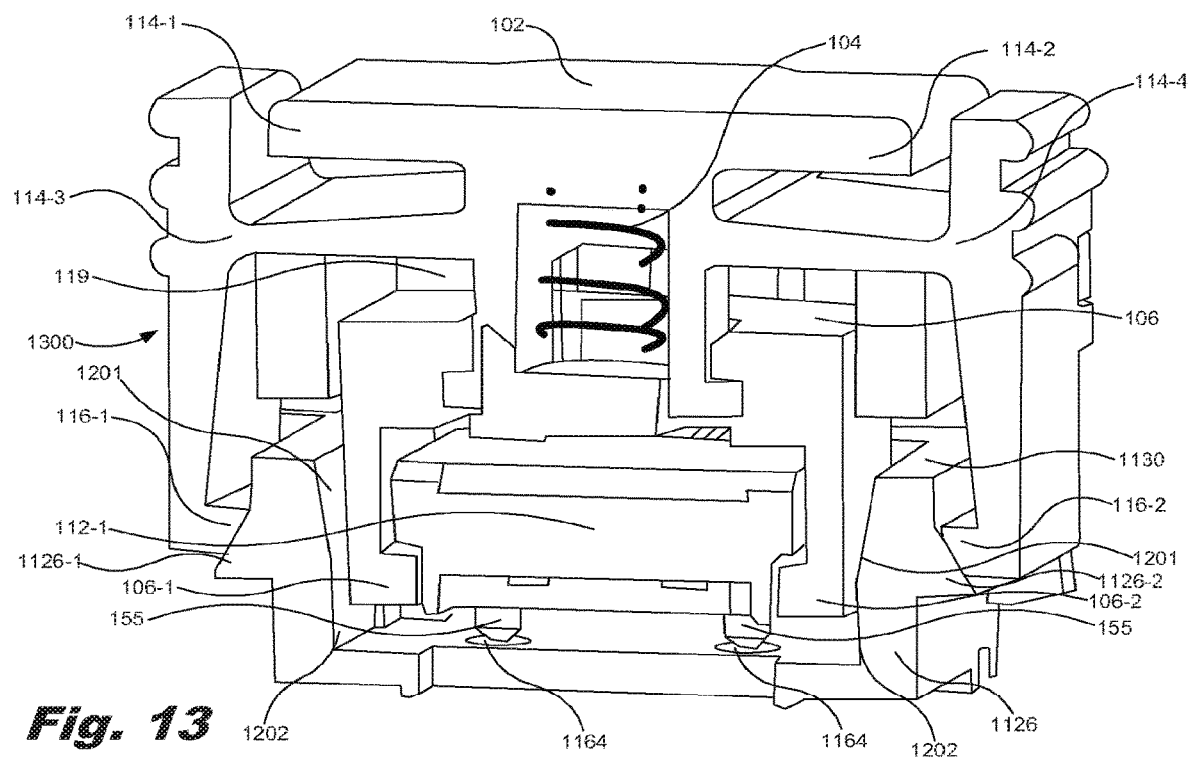
Figure 14:
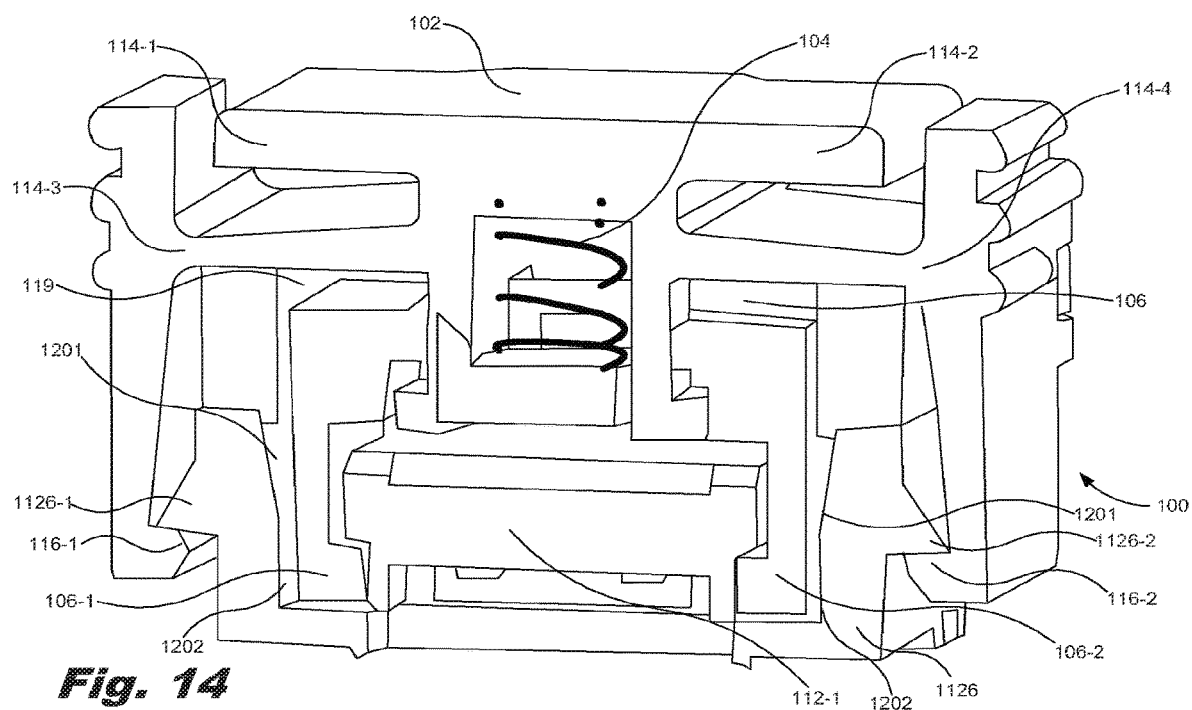
Figure 15:
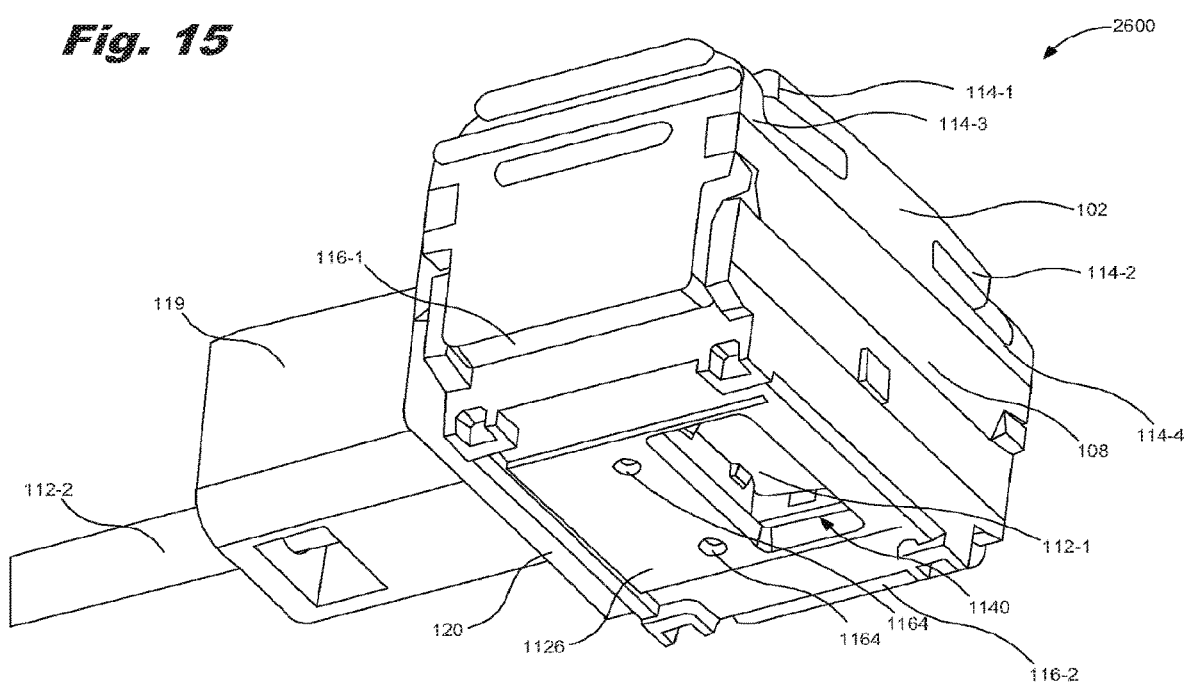
FIG. 15 is a bottom isometric view of the OCA of FIG. 1 coupled to a socket, according to another example of principles described herein.

FIGS. 12 through 14 are cutaway, isometric views of the OCA (100) of FIG. 1 being coupled to a socket (1126), according to another example of principles described herein. Further, FIG. 15 is a bottom isometric view of the OCA of FIG. 1 coupled to a socket (1126), according to another example of principles described herein. FIGS. 12 through 15 depict the OCA (100) in various stages of coupling with respect to the socket (1126). In FIG. 12, the OCA (100) is not touching the socket (1126), but is partially aligned with the socket (1126). In this state, the locking arms (186-1) formed on the connector housing (102) retain the ferrule holder (106) in the OCA (100). In the state depicted in FIG. 12, the outer edges of the ferrule holder (106) are used to pre-aligned or coarsely aligned the ferrule (112-1) with the photoelectric converters (FIG. 11, 1140) on the OES assembly (FIG. 11, 1124). As the OCA (100) is moved into the position depicted in FIG. 12, the outer edges of the ferrule holder (106) abut with and are guided by a tapered portion (1201) of the socket (1126). The tapered portion (1201) may be included on any number of sides of the socket (1126). The gap (1401) allows the ferrule holder (106) to not be constrained by the gasket (108) and move or deflect, and be directed by the tapered portion (1201) of the socket (1126) as the OCA (100) is coupled to the socket (1126).

In FIG. 13, the walls of the ferrule holder (106) continue to pre-align by engaging with the interior surface (1202) of the walls of the socket (1126). The interior surface (1202) provides a finer alignment of the ferrule housing (106) relative to the tapered portion (1201) in preparation for seating of the ferrule housing (106) in the socket (1126). In this state, a number of guide pins (155) formed on the bottom of the ferrule (112-1) are not engaged with a number of alignment recesses (1164) defined in the socket (1126). As mentioned above, the gap (FIG. 2, 1401) allows the ferrule holder (106) to move or deflect from a centered position. Thus, in FIG. 13, when the ferrule holder (106) is being aligned with the socket (1126), the movability of the ferrule holder (106) provides for alignment to occur. Further, as depicted in FIG. 13, the guide pins (155) include chamfered ends that allow for the guide pins (155) to mate with the recesses (1164) and provide a final alignment between the ferrule holder (106) and the socket (1126), and, resultantly, between the ferrule (112-1) and the photoelectric converters (FIG. 11, 1140). The chamfered ends of the guide pins reduces or eliminates the possibility of pin stubbing where the guide pins (155) stub into the bottom surface of the socket (1126).

In FIG. 14, the OCA (100) is coupled to the socket (1126). In this state, the securing features (116-1, 116-2) of the connector housing (102) are coupled to the securing features (1126-1, 1126-2) on the socket (1126). Further, the ferrule holder (106) unseats from the locking arms (186-1, 186-2) of the connector housing (102) a certain distance. This allows the spring (104) to push down on the ferrule holder (106), and, in turn, push the ferrule (112-1) into a seated position within the socket (1126). Thus, when force is placed on top of the connector housing (102), the OCA (100) is coupled to the socket (1126). Further, the spring (104) provides for an increase in stability and secured alignment of the optical elements of the system despite the potential for force to be applied to the optical cable (112-2). The boot (119) provides further protection by providing strain relief when forces are applied to the optical cable (112-2) along the length of the optical cable (112-2).

Further, in the state depicted in FIG. 14, there are spaces above and below the ferrule holder (106). These spaces create float among the elements of the OCA (100) so that the mating elements and surfaces of the ferrule (112-1) and the socket (1126) align. The gasket (108) is compressed between the connector housing (102) and the socket (1126) and the displacement of the spring (104) places force on the mating plane between the ferrule (112-1) and the socket (1126). In this example, the force applied by the spring (104) is independent from the force applied by the compression of the gasket (108) between the connector housing (102) and the socket (1126).

Unlatching of the connector housing (102) from the socket (1126) is performed by applying force to the tops of the securing feature (116-1, 116-2) above the pivots (114-3, 114-4) as indicated by arrows B and C in FIG. 3. For example, the user may apply a force to a first top portion and a second top portion of the securing features (116-1, 116-2). With a sufficient force is applied, the securing features (116) pivot about the pivots (114-3, 114-4), and disengage from the corresponding securing features (FIG. 11, 1126-1, 1126-2) of the socket (FIG. 11, 1126). Once the securing features (116) are disengaged from the corresponding securing features (FIG. 11, 1126-1, 1126-2), the user may lift up on the connector housing (102) to remove the OCA (100) from the socket (1126). As a result, the OCA (100) may be removably secured to the socket (1126) without the use of fasteners or tools to remove the fasteners.

Figure 16:
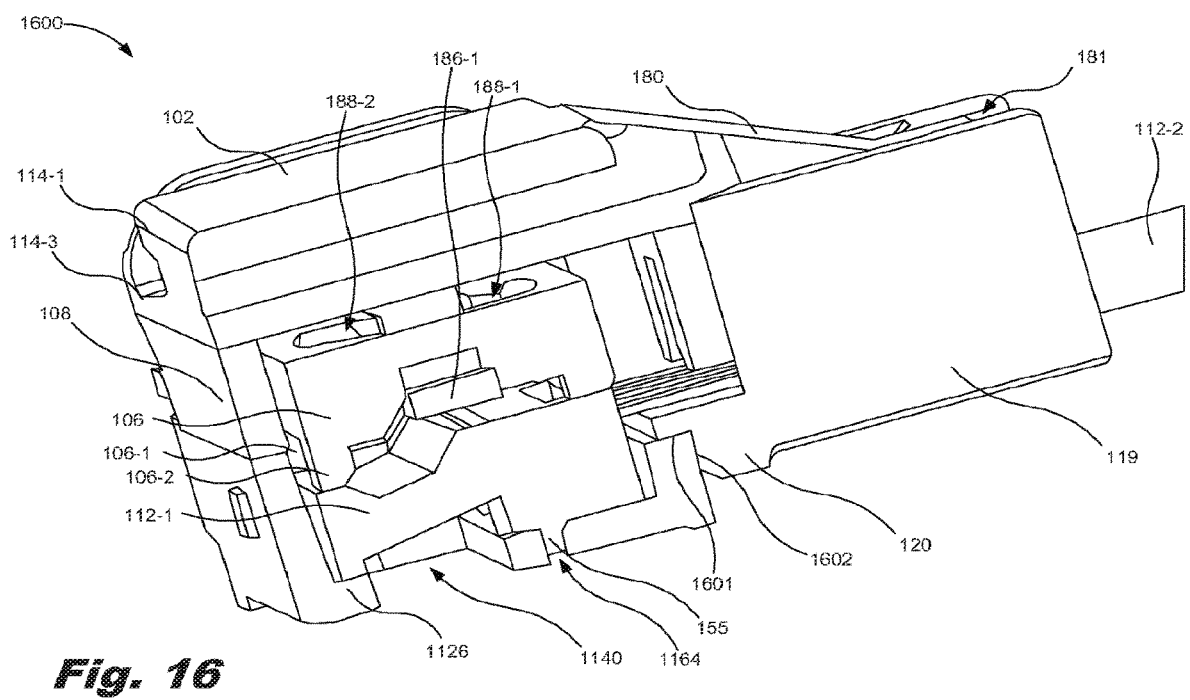
FIG. 16 is a cutaway isometric view of the OCA of FIG. 1 coupled to a socket, according to another example of principles described herein.

With reference now to FIGS. 15 and 16, FIG. 15 is a bottom isometric view of the OCA of FIG. 1 coupled to a socket (1126), according to another example of principles described herein. FIG. 16 is a cutaway isometric view of the OCA (100) of FIG. 1 coupled to a socket (1126), according to another example of principles described herein. The protrusion (120) is also formed on the gasket (108) sized and dimensioned to fit against a number of surfaces of the socket (1126). As depicted in FIG. 16, the protrusion (120) abuts both a horizontal surface (1601) and a vertical surface (1602) of the socket (1126). In this manner, the ferrule (112-1), optical cable (112-2), and the exit of the optical cable (112-2) are sealed in both horizontal and vertical directions.

Figure 17:
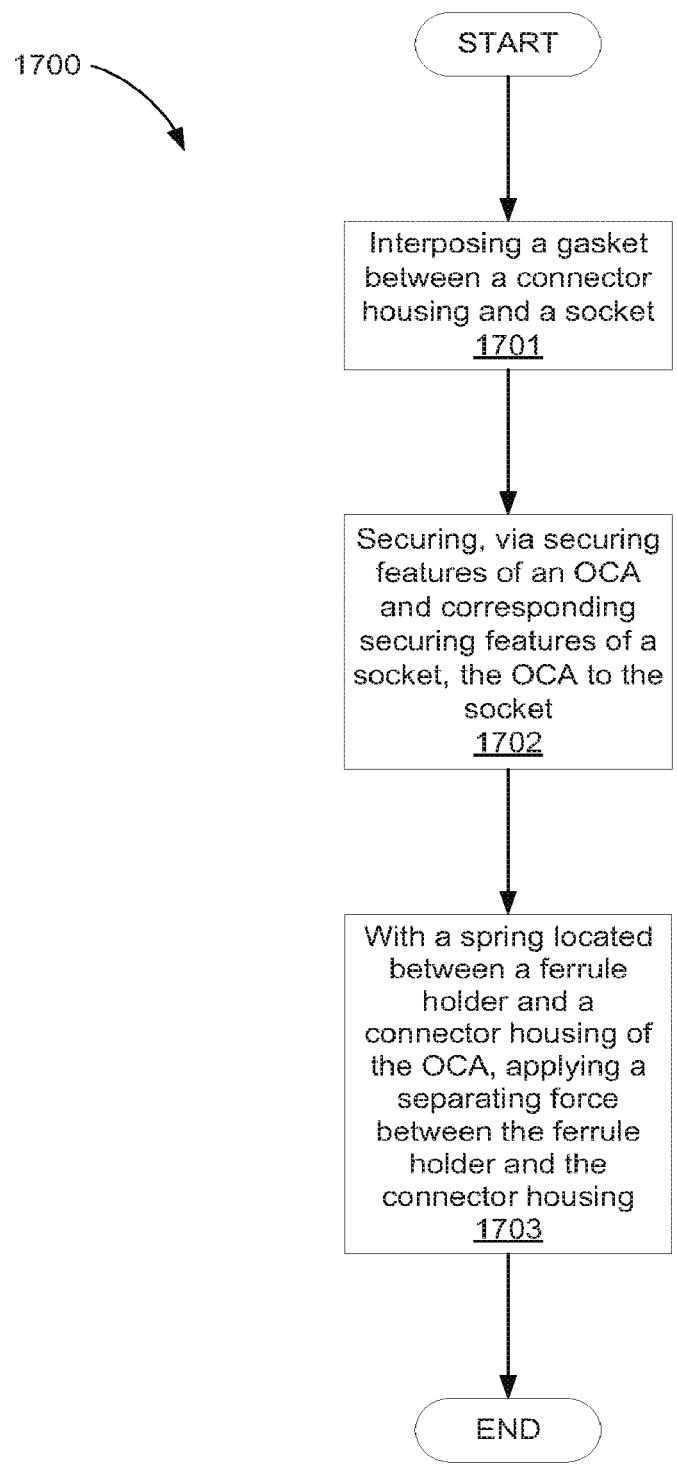
FIG. 17 is a flowchart of a method for maintaining alignment between optical components and photoelectric converters, according to one example of principles described herein.

FIG. 17 is a flowchart of a method (1700) for maintaining alignment between optical components (112-1, 112-2) and photoelectric converters (FIG. 11, 1140), according to one example of principles described herein. In this example, the method (1700) includes interposing a gasket (108) between a connector housing (102) and a socket (1126). The method further includes securing (1702), via securing features (116) of an OCA (100) and corresponding securing features (1126-1, 1126-2) of a socket (1126), the OCA (100) to the socket (1126) and with a spring (104) located between a ferrule holder (106) and a connector housing (102) of the OCA (100), applying (1703) a separating force between the ferrule holder (106) and the connector housing (102).

The method (1700) includes securing (1701), via securing features (116) of an OCA (100) and corresponding securing features (1126-1, 1126-2) of a socket (1126), the OCA (100) to the socket (1126). When the securing features (116) of the OCA (100) are engaged with the corresponding securing features (1126-1, 1126-2) of the socket (1126), the OCA (100) is secured to the socket (1126).

As mentioned above, the method (1700) includes with a spring (108) located between a ferrule holder (106) and a connector housing (102) of the OCA (100), applying (1703) a separating force between the ferrule holder (106) and the connector housing (102). When the OCA (100) is secured to the socket (1126), the spring (108) is compressed. When the spring (108) is compressed, the spring (108) exerts the separating force between the ferrule holder (106) and the connector housing (102). These forces maintain the alignment between the optical components (112-1, 112-2) housed within the OCA (100) and the photoelectric converters (1140) contained on a OES assembly (1124). Further, these forces indirectly compress a gasket (118) of the OCA (100) to provide a seal between the OCA (100) and the socket (1126). This seal eliminates contamination of the interior of the OCA (100)/socket (1126) assembly including the optical elements (112), and the photoelectric converters (1140). In other words, the environment interior to the socket (1126), gasket (108), connector housing (102), boot (119), and optical cable (112-2) is sealed from contaminants that may be external to these elements. In this manner, these elements and the optical path formed by the OCA (100) and OES (1124) do not suffer from adverse effects of contamination.

Due to the design of the OCA (100) and the socket (1126), the OCA (100) and the socket (1126) maintain alignment between the optical components (112) housed within the OCA (100) and the photoelectric converters (1140) on the OES assembly (1124). This alignment may include an alignment on all axis. For example, the OCA (100) and the socket (1126) maintain a vertical alignment, a horizontal alignment, and a lateral alignment, as well as three rotational alignments, for the optical components (112) housed within the OCA (100) and the photoelectric converters (1140) located on the OES assembly (1124).

In one example, the optical cable (112-2) may be mounted to external objects. For example, the optical cable (112-2) may be mounted to a rail of a server rack. As a result, external forces may be applied to the optical cable (112-2). Since the optical cable (112-2) is connected to the OCA (100), and in optical communication with the photoelectric converters (1140), these external forces may cause a shift in the position of the optical components and a resulting decrease in optical power coupled through the system without the protection afforded by a number of elements of the OCA (100) and OES assembly (1124). However, due to the design of the OCA (100) described herein, the OCA (100) opposes external forces applied to the optical cable (112-2) to maintain the alignment when the OCA (100) is connected to the socket (1126) due to, for example, the boot (119), the guide pins (155) and recesses (FIG. 11, 1164), the socket (1126), and other components of the OCA (100) and OES assembly (FIG. 11, 1124).

The preceding description has been presented to illustrate and describe examples of the principles described. This description is not intended to be exhaustive or to limit these principles to any precise form disclosed. Many modifications and variations are possible in light of the above teaching.

What is claimed is:

1. An optical connector assembly (OCA) comprising:
  a connector housing having securing features extending downwardly from the connector housing, the securing features attachable to or detachable from an optoelectronic substrate (OES) assembly having one or more transceiver components;
  a ferrule holder coupled to the connector housing and located between the securing features, wherein a fiber optic ferrule is slidably attached to the ferrule holder; and
  a mechanical sealing device coupled to the connector housing and to an upward facing surface of the OES to form a contaminant seal between the OCA and the OES when the OCA is attached to the OES.

2. The OCA of claim 1, further comprising a spring located between the connector housing and the ferrule holder, the spring biased to provide a downward force between the ferrule holder and the connector housing.

3. The OCA of claim 1, wherein the mechanical sealing device is a gasket that is compressed when the OCS is secured to the OES.

4. The OCA of claim 1, wherein the securing features are latches or hooks.

5. The OCA of claim 1, wherein a portion of each of the securing features extends above the connector housing, the securing features each being pivotable about respective pivots and movable toward respective stops above the connector housing.

6. The OCA of claim 1, wherein when attached to the OES, a vertical distance between the ferrule and the one or more transceiver components is maintained when an external force is applied to the OCA.

7. The OCA of claim 1 further comprising a boot monolithically formed with the mechanical sealing device.

8. The OCA of claim 7, wherein the mechanical sealing device comprises a protrusion sized to fit in a corresponding notch of a socket in the OES, the protrusion and the notch forming the contaminant seal between the connector housing and the socket.

9. The OCA of claim 8, wherein the boot includes a boot recess to receive an optical cable and the mechanical sealing device has an opening into which the ferrule having the optical cable is insertable.

10. The OCA of claim 1, wherein the ferrule is in an offset position with respect to the ferrule holder.

11. The OCA of claim 1, wherein there is a gap between the ferrule holder and the mechanical sealing device on at least one side of the ferrule holder.

12. The OCA of claim 1, wherein the upward facing surface of the OES is on a socket coupled to the OES.

13. An optical system comprising:
  an optoelectronic substrate (OES) assembly having one or more transceiver components; and
  an optical connector assembly (OCA) including:
    a connector housing having securing features extending downwardly from the connector housing, the securing features attachable to or detachable from the OES,
    a ferrule holder coupled to the connector housing and located between the securing features, wherein a fiber optic ferrule is slidably attached to the ferrule holder, and
    a sealing device coupled to the connector housing and to an upward facing surface of the OES to form a contaminant seal between the OCA and the OES when the OCA is attached to the OES,
  wherein when the OCA is attached to the OES, an optical link is formed between the ferrule and the one or more transceiver components.

14. The optical system of claim 13 further comprising:
  a socket attached to the OES and located between the OES and the OCA, the securing features of the connector housing coupled to corresponding securing features of the socket to attach the OCA to the OES.

15. The optical system of claim 13, wherein the socket includes the upward facing surfaces, said upward facing surface having a top flat surface interfaceable with the sealing device and a lower flat surface interfaceable with a boot of the OCA to for the contaminant seal.

16. The optical system of claim 13, wherein the socket includes a recess configured to receive a guide pin of the ferrule.

17. The optical system of claim 13, wherein the socket includes an inner wall having at least a portion thereof tapered.

18. A method for forming an optical link between an optical connector assembly (OCA) and an optoelectronic substrate (OES) assembly having one or more transceiver components thereupon, the method comprising:
  guiding outer edges of a ferrule holder of the OCA having a ferrule therein into an inner wall portion of the OES assembly, the ferrule holder being movable within the OCA for pre-alignment thereof with the OES assembly and positioned within a connector housing of the OCA;
  slidably attaching securing features of the connector housing to corresponding securing features of the OES assembly
  mating a guide pin of the ferrule with a recess in the OES assembly;
  pushing the ferrule older into a seated position within the OES assembly via a spring between the connector housing and the ferrule holder;
  placing a sealing device attached to the connector housing on level surfaces of the OES assembly for sealing the OCA from contaminants; and
  positioning a guide pin of the ferrule into a recess on the OES assembly for forming the optical link, wherein the ferrule is at a fixed distance from the one or more transceiver components when the optical link is formed.

19. The method of claim 18, wherein the inner wall is part of a socket attached to the OES assembly, and wherein said guiding includes guiding the ferrule holder first into a tapered portion of the inner wall and subsequently into a vertical portion of the inner wall of the socket.

20. The method of claim 18, wherein said slidably attaching the securing features of the connector housing includes pivoting the securing feature about respective pivots on the connector housing to flex the securing features.

* * * * *

UNITED STATES PATENT AND TRADEMARK OFFICE
CERTIFICATE OF CORRECTION

PATENT NO. : 11,249,265 B2
APPLICATION NO. : 16/920487
DATED : February 15, 2022
INVENTOR(S) : Paul Kessler Rosenberg et al.

Page 1 of 1

It is certified that error appears in the above-identified patent and that said Letters Patent is hereby corrected as shown below:

In the Claims

Column 15, Line 37, "OCS" should be --OCA--.

Column 16, Line 50: "older" should be --holder--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*